Oct. 20, 1964

E. W. ALLARDT ET AL 3,153,718

FLEXIBLE WELDING ELECTRODES

Filed Dec. 26, 1963

INVENTORS
Eli Abbonizio
Ernst W. Allardt
Edward M. Juhn

BY

ATTORNEY

Oct. 20, 1964   E. W. ALLARDT ETAL   3,153,718
FLEXIBLE WELDING ELECTRODES
Filed Dec. 26, 1963   4 Sheets-Sheet 3
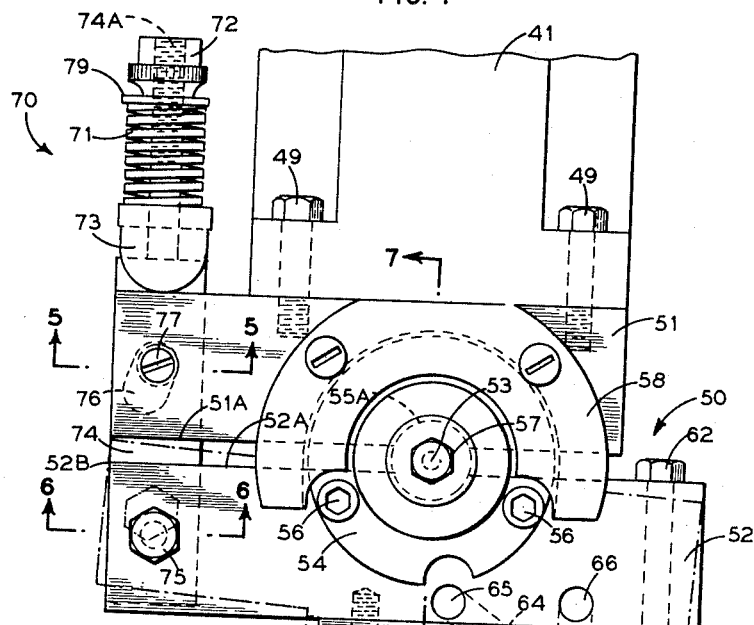
FIG. 4
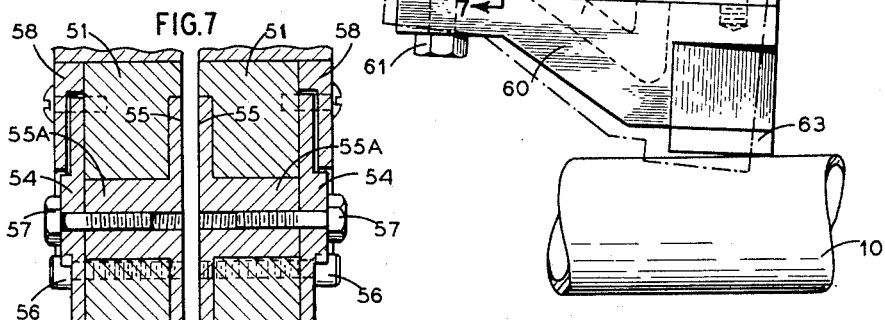
FIG. 7
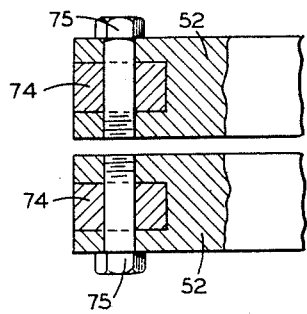
FIG. 6
FIG. 5

Oct. 20, 1964    E. W. ALLARDT ETAL    3,153,718
FLEXIBLE WELDING ELECTRODES
Filed Dec. 26, 1963    4 Sheets-Sheet 4

United States Patent Office

3,153,718
Patented Oct. 20, 1964

3,153,718
FLEXIBLE WELDING ELECTRODES
Ernst W. Allardt, Edward M. Juhn, and Eli Abbonizio, Alliance, Ohio, assignors to The Babcock & Wilcox Company, New York, N.Y., a corporation of New Jersey
Filed Dec. 26, 1963, Ser. No. 333,359
9 Claims. (Cl. 219—65)

This invention relates to equipment for use in the manufacture of electric resistance welded tubing, and more particularly to a novel flexible welding electrode arrangement for effecting continuous and uniform contact between the electrodes and the adjacent edge portions of the formed metal strip which are being integrally joined to form the tube.

The general method and apparatus for producing resistance welded tubing of the type with which the present invention is concerned is disclosed, for example, in U.S. Patent 2,833,910, by R. J. Stanton, et al. This patent discloses a method for continuously advancing a metal strip longitudinally and gradually forming it to a generally circular cross section so that the strip edges form a longitudinal V-shaped gap, applying pressure thereto to close the gap at a welding point and thereby effecting the welding together of the edges. According to this method, the heating of the gap edges to welding temperature is effected by the use of a pair of electrodes connected to an oscillatory current source and applied respectively adjacent the gap edges at points positioned shortly in advance of the welding point, the current applied to the electrodes being of a frequency sufficiently high so that the lowest impedance path between the electrodes follows the V-shaped gap edges between the electrodes and through the welding point. By utilizing high frequency current, the heat due to the flow of current through the tubing is thus concentrated along the edges of the V-shaped gap between the electrodes and the welding point.

In operation of the welding apparatus described above it has been found that the formed tube is subject to slight variations in shape and that it deviates slightly from true axial travel as it travels past the welding electrodes. The extent of these variations is a function of the diameter and wall thickness of the tubing being fabricated, and may be caused by a combination of mechanical forces exerted by the tube forming rolls, thermal stresses due to the heat generated by the electrodes, and variations in the physical properties of the tubing material, e.g., hardness and ductility. As a result of these variations in the shape and in the direction of travel of the formed tube, if the portions of the electrodes coming in contact with the tube (the electrode shoes) are rigidly fixed in position, they will not follow precisely the changing shape or contour of the formed tubes, and the requisite, effective contact between the shoes and the tube will be interrupted thereby causing a defective weld.

It has also been found that the quality of the weld is dependent, at least to some extent, on the force with which the electrode shoes are maintained in contact with the tube. Experience has shown that the optimum force or contact pressure required to produce a satisfactory weld varies, depending on the diameter and wall thickness of the tube material being welded and the particular metal being used. When starting a particular "run" of tubing, this predetermined pressure relationship is established; however, as the tube shape or position deviates slightly from the norm, the force exerted by the fixed position electrodes on the tube will vary, and defective weld portions may result. Also, with fixed position electrodes, as the shoes wear down, the contact pressure correspondingly decreases, and the height of the shoes must be constantly adjusted to compensate for shoe wear.

Another troublesome problem which arises in connection with the contact between the shoes and the surfaces of the formed tube adjacent the edges is that of unequal height of the edges. In such a case, the electrode shoe in contact with the higher edge may function properly, but contact between the other shoe and the lower edge will be interrupted. When this occurs, the edges will not be heated to the proper welding temperature and the strength of the resulting weld seam will be inadequate. Furthermore, arcing may occur between the shoe and the strip edge which may cause damage to the shoe and arc burning of the tubing. If this occurs, the entire welding operation will have to be discontinued until the damaged shoe is replaced.

Advantageously, the present invention provides an apparatus for effecting continuous and uniform contact between the electrode shoes and their respective contact areas adjacent the outer edges of the formed tube, as well as compensation for all of the above described operating situations when the entire tube or only one edge of the formed tube deviates from its normal vertical position. Means are also provided for periodically adjusting the position of the electrodes relative to the moving tube, and for continuously monitoring the contact pressure between the tube and the electrode shoes. Furthermore, the apparatus is adaptable for use in the manufacture of tubing to a wide range of diameters and wall thickness, while still being sufficiently simple in construction and operation that it can be operated by an average technically trained workman.

In the present invention a formed metal tube, the longitudinal seam of which is to be welded, is continuously and rapidly advanced past a welding point. The gap edges of the tube are purposely kept spaced apart in advance of the welding point. Then, prior to the initiation of welding, contact shoes, having imposed thereon radio frequency current, are slidably engaged with the exterior surface of the tube in the areas close to and on opposite sides of the gap, so that the greater part of the imposed welding current flow within the metal tubing is directed along and confined to the V-shaped path formed by the opposed edges of the tubing metal as the edges are about to come together at the welding point. When using radio frequency current, the temperature of the edges of the tubing being formed will continue to increase after the tubing has passed the electrode shoe contacting point and will reach a maximum just as the edges are forced together by rollers at the welding point.

According to the present invention, an upright welder support is mounted adjacent the tube manufacturing line. A welder support frame, overlying the tube line, is engaged with the welder support, with provisions made for selectively raising and lowering it. A substantially horizontal electrode support plate, formed of a non-magnetic insulating material, is hingedly mounted on the frame, and a pair of matching electrodes are rigidly connected to the plate and extend downwardly through an opening provided therein. Each electrode includes an upper conductor and a lower conductor pivotally mounted to the upper conductor. An electrode shoe is attached to each lower conductor, and these shoes are arranged to slidably contact the tube adjacent the gap edges at positions in advance of the welding point. To effect continuous and uniform contact pressure between the electrode shoes and the tube, two flexing mechanisms are provided. The first of these includes a hinge joint connecting one end portion of the support plate to the rearward end of the support frame, and an adjustable spring connection between the opposite end of the support plate and the frame. This first flexing mechanism accommodates deviations of the uppermost of the tube edges from strict axial movement. A dial indicator may be connected between the forward end of the support plate and the frame to continuously register the relative vertical position of these components, which relative position is proportional to the contact force between the electrode shoes and the tube. The second flexing mechanism includes individually operative electrode springs interconnecting the upper and lower conductors of each of the electrodes. This second flexing mechanism accommodates differences in the height of the adjacent tube edges at the point of contact between the shoes and the tube.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

In the drawings:

FIG. 4 is an enlarged side view of the lower electrode assembly shown in FIG. 1;

FIG. 5 is a partial sectional view taken along line 5—5 of FIG. 4;

FIG. 6 is a partial sectional view taken along line 6—6 of FIG. 4;

FIG. 7 is a partial sectional view taken along line 7—7 of FIG. 4;

Figures 1, 2:
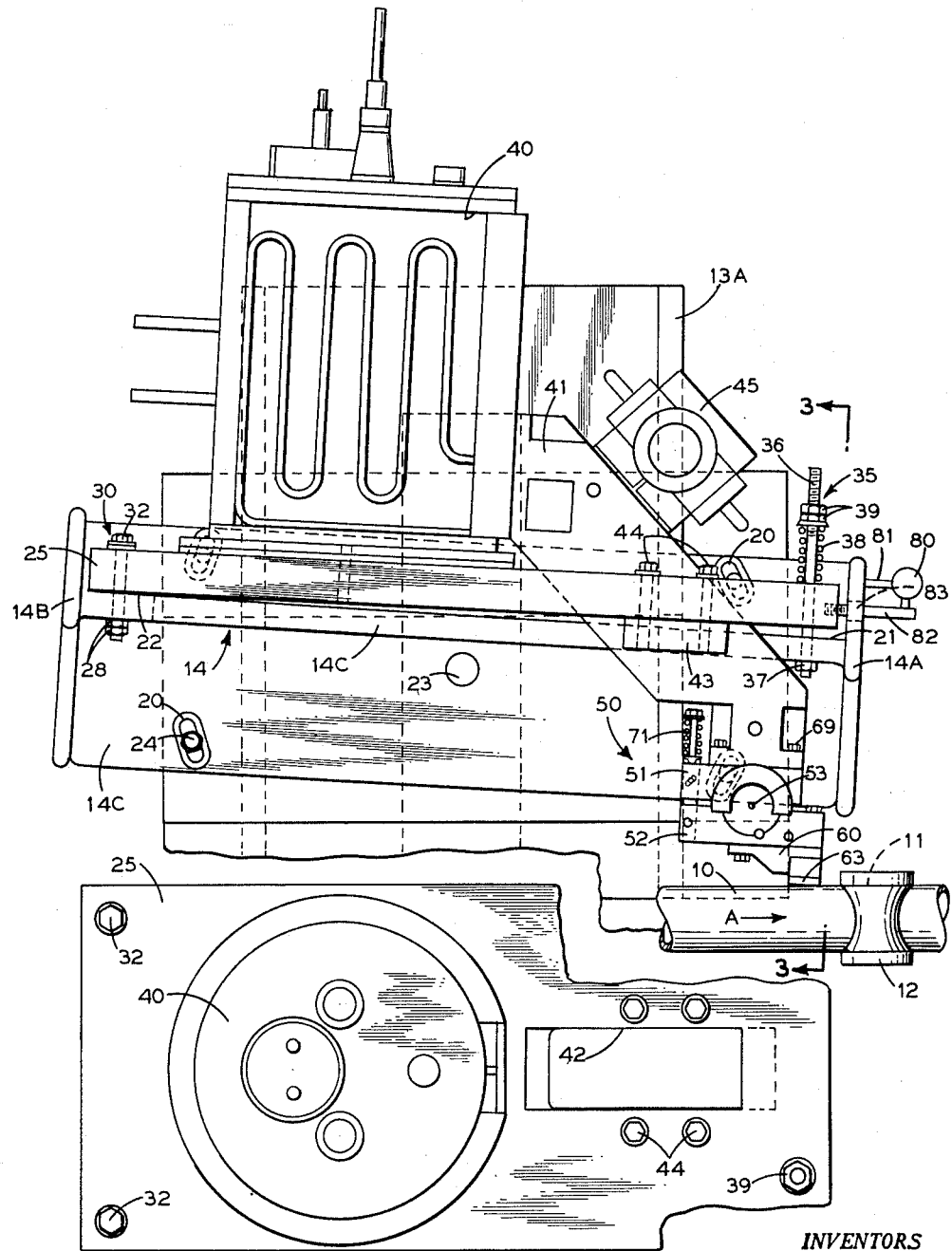
FIG. 1 is a side view of the flexible electrode welding assembly.
FIG. 2 is a plan view of the support plate showing its relationship to other associated components.
Figure 3:
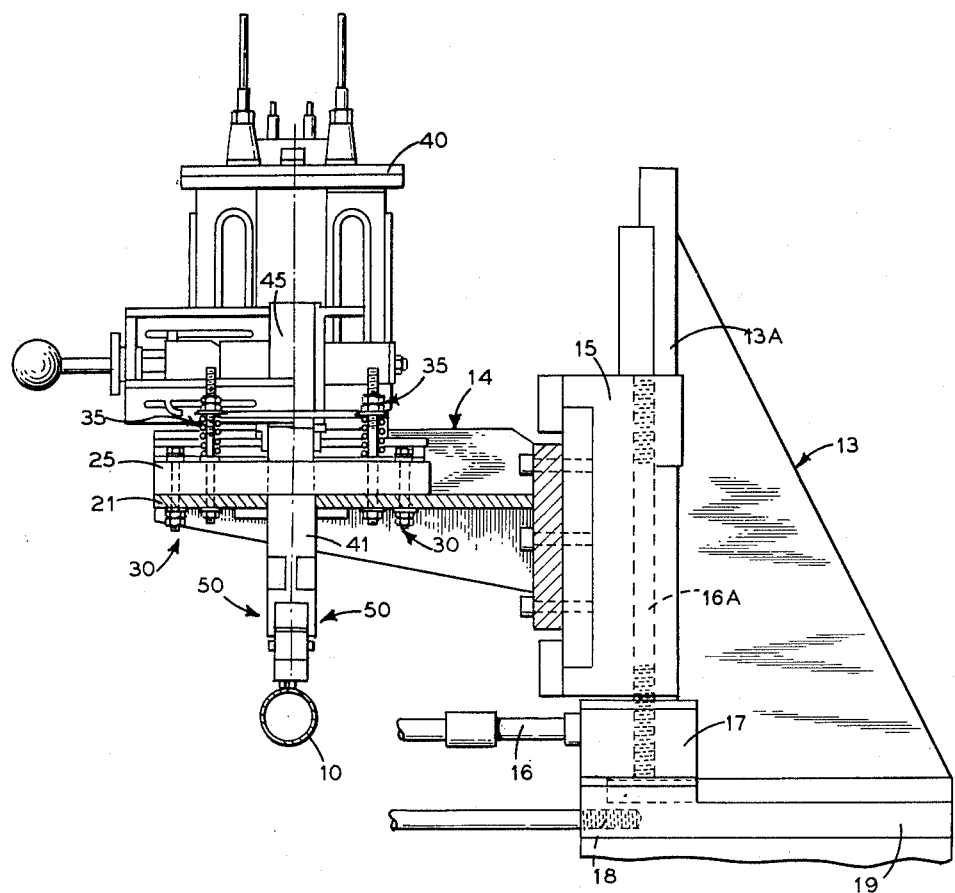
FIG. 3 is an end view of the welding assembly taken along line 3—3 of FIG. 1.
Figure 9:
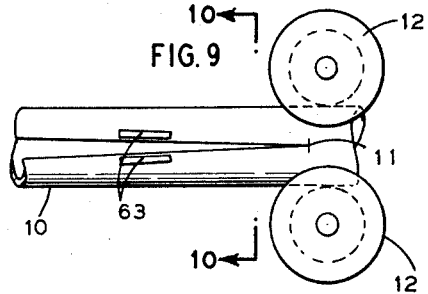
FIG. 9 is a top view of the tube showing the location of the electrode contacts in relation to the welding point.

The complete flexible electrode welding assembly is shown in FIGS. 1 and 3 in relation to a tube 10 which is horizontally and axially being advanced along the tube line in the direction indicated by the arrow "A" in FIG. 1. It will be understood that the tube is being continuously formed from a metal strip to a generally circular cross section upstream of the tube portion shown, and that the strip edges form a longitudinal V-shaped gap 9 immediately upstream of the welding point 11 as shown in FIG. 9. Squeeze rolls 12 force the heated tube edges together at the welding point 11 to close the gap, effecting welding of the edges and thereby completing formation of the tube 10.

A rigid upright welder support 13 is mounted adjacent the moving tube 10, and carries a welder frame 14 which is slidably engaged through a guide member 15 with the vertical track portion 13A of the support 13. A vertical screw 16A, is provided for raising and lowering the frame 14 relative to the vertical track portion 13A. To raise or lower the frame 14, the screw 16A is rotated by the operator by means of a handle (not shown) connected to the laterally extending drive arm 16 which connects to the screw 16A by a conventional type bevel gear set (not shown) in the gear box 17. A horizontal screw 18 is also provided so that the operator may move the entire welding assembly laterally. By turning a handle (not shown) connected to the horizontal screw 18, the welder support 13 may be moved laterally relative to the base plate 19. The support 13 and base plate 19 are interconnected by a track and guide assembly (not shown).

Provisions are also made for tilting the frame 14 with respect to the support 13 by means of four arcuate slots 20 suitably placed in the side portion 14C of the frame 14 about the central pivot bolt 23. A lock bolt 24 passes through each slot 20 and is threadably engaged in the guide member 15. Thus when it is desired to tilt or cant the frame 14, the lock bolts 24 are loosened, the frame 14 is rotated about the pivot bolt 23, and the lock bolts 24 are then tightened to secure the frame 14 in the desired position.

The frame 14 is formed with similar forward and rear portions 14A and 14B respectively and a single side portion 14C, which collectively define a generally rectangular space having one side thereof open. The forward and rear portions 14A and 14B are respectively formed with horizontal legs 21 and 22 which serve as seating surfaces for the support plate 25. The plate 25 is rectangular in shape, having a width substantially equal to the length of the forward and rearward portions 14A and 14B of the frame 14 and a length slightly less than the distance measured between these portions, so that the plate 25 covers the space defined by the frame 14 and extends over the horizontal legs 21 and 22. The plate 25 is connected at its rearward end to the frame 14 by hinge assembly 30 at the corners of the plate 25, and at its forward end to the frame 14 by spring connection 35 at the corners of the plate 25.

The support plate 25 may suitably be formed of any non-magnetic insulating material. Due to the high frequency voltage present in the vicinity of the plate 25 when the welder is in operation, if a magnetic material such as steel were used, eddy currents would be dissipated in the plate, and it would become overheated. A material found to be suitable for this use is glass fibre reinforced plastic.

A transformer 40 is supported by and connected to the support plate 25. The transformer 40 is connected to a power source or oscillator (not shown) which produces high frequency current at about 7000 volts with a frequency of about 450,000 cycles per second. The transformer 40 reduces the 7000 volt input to about 150 volts. A pair of rigid electrode leads 41 are connected to the transformer 40 and pass forwardly and downwardly through a sloping rectangular opening 42 (see FIG. 2) in the support plate 25. Each lead 41 is formed with a laterally extending lug 43 which is fastened to the plate 25 by bolts 44. A power control unit 45 is mounted on the leads 41, and suitable insulation material (not shown) is provided between the leads 41 to prevent arcing therebetween.

A pair of electrode assemblies 50, shown in detail in FIGS. 4 through 7, are connected by bolts 49 to the downwardly extending lower portion of the leads 41. Each electrode assembly 50 includes an upper conductor 51 and a lower conductor 52 which are capable of relative rotation about the pivot point 53. The assembly which allows this relative rotation includes a circular outer retainer 54 and a circular inner retainer 55. The inner retainer 55 is formed with a cylindrical trunnion portion 55A which engages oppositely disposed segmental cylindrical bearing recesses formed in the lower surface 51A of the upper conductor 51 and in the upper surface 52A of the lower conductor 52, which surfaces are of the same width. An axial bolt 57, passes through the outer retainer 54 and is threadably engaged in the trunnion 55A of the inner retainer 55, so that the interconnected outer and inner retainers 54 and 55 form a spindle-shaped element, the lower portion of which is fastened to the lower conductor 52 by retainer bolts 56 which pass through openings in the outer retainer 54 and lower conductor 52 and are engaged in threaded openings provided in the inner retainer 55. The upper conductor 51 fits between and is slidably engaged with the upper portions of the outer and inner retainers 54 and 55. Because the bearing recesses in the upper and lower conductors 51 and 52 are not formed as deep as the radius of the trunnion 55A, the upper surface 52A of the lower conductor and the lower surface 51A of the upper conductor are separated by a space when in parallel relation, as shown in FIG. 4.

An electrode shoe 60 is fastened by bolts 61 and 62 to the front portion of the lower surface of each lower conductor 52. A welding contact 63 is affixed by suitable means, such as bolting or silver soldering, to the front of the lower surface of the shoe 60. This contact 63 is formed of a suitable material such as silver-tungsten alloy, and is the portion of the electrode assembly 50 which engages the tube 10 as it is being formed.

Coolant is circulated through the lower conductor 52 and the shoe 60 through the coolant passageway 64 formed therein. The coolant passageway inlet 65 and outlet 66 may be suitably fitted with inlet and outlet tubes (not shown) which connect respectively to a cooling water source and drain. A shield 58, made of plastic or other suitable non-conducting material, is bolted to the upper conductor 51 and covers the upper portion of the front retainer 54 to prevent electrical arcing between the upper portion of the front retainer 54 and the coolant tubes (not shown) which are in electrical conducting relationship with the lower conductor 52 and are normally in close proximity to the upper portion of the front retainer 54.

The rearward portions of the upper and lower conductors 51 and 52 of each electrode are suitably retained in their proper relationship by the spring assembly 70 which includes a spring 71, an upper compression nut 72, a rocking washer 73, and a retainer bar 74. The rearward ends of the upper and lower conductors 51 and 52 are formed with vertically extending grooves. The vertically extending retainer bar 73 fits snugly inside the groove in each of the conductors 51 and 52, and is rigidly attached to the lower conductor 52 by the retainer bar holding bolt 75 as best shown in FIG. 6. As shown in FIGS. 4 and 5, the bar 74 fits inside the groove in the upper conductor 51, and is formed with a curved, elongated slot 76 which has as its longitudinal radius of curvature, the pivot point 53. A stop bolt 77 extends through the slot 76 and is threadably engaged with the upper conductor 51. Suitable electrical insulating material 78 is provided between the upper conductor 51, the retainer bar 74 and the stop bolt 77 to prevent the flow of electrical current from the upper conductor 51 to the lower conductor 52 through the retainer bar 74. A threaded shank portion 74A of the retainer bar 74 extends above the upper conductor 51. A slotted rocking washer 73 and compression spring 72 are fitted over the shank 74A which has a compression nut 72 threaded on the upper end thereof. The compression nut 72 bears downwardly on the washer 79 which in turn bears downwardly on the spring 71, placing it in compression at all times. It should be appreciated that the force exerted by the spring 71 can be adjusted by turning the compression nut 72.

The path of flow of high frequency current within the electrode assembly 50, from the transformer 40 to the electrodes contacts 63, will now be described. The current flows from the transformer 40 down through one of the rigid electrode leads 41 and into the upper conductor 51. The current is then conducted to the lower conductor 52 through the trunnion 55A and outer and inner retainers 54 and 55, and thence downwardly through the shoe 60, the contact 63 and thence to the tube 10. The current flows along the V-shaped gap in the tube 10, passing through the welding point 11, and then flows upwardly through the other electrode in a path which is the reverse of that just described. To enhance the flow of current between attached parts, as for example between the lower conductors 52 and the shoes 60, the mating surfaces are coated with thin layers of silver plating and hand fitted to provide maximum contact. It should be understood that minimum clearances will have to be maintained between the upper conductor 51 and the outer and inner retainers 54 and 55 to afford optimal passage of welding current and to avoid arcing and attenuation of electrical current. Electrical insulation (not shown) should also be provided between the electrodes to prevent arcing therebetween and consequent loss of electrical energy.

In FIG. 4, the electrode assembly is shown in its operative restrained condition when the contacts 63 are being exerted against the tube 10. The phantom depiction of the lower conductor 52 shows the position of this element in its unrestrained condition. In this condition, by virtue of the compressive force exerted by the spring 71, the lower conductor 52 will rotate about the pivot point 53 clockwise relative to the upper conductor 51, the limit of rotation being reached when the upper rear corner 52B of the lower conductor 52 engages the rear lower surface 51A of the upper conductor 51. When the assembly 50 is placed in its operative position, i.e., when an upward force is exerted on the contacts 63, the lower conductor 52 rotates counter-clockwise relative to the upper conductor 51 further compressing the spring 71, the limit of rotation in this direction being defined by the upper extremity of the slot 76 in the retainer bar 74 which engages with the stop bolt 77.

Figure 8:
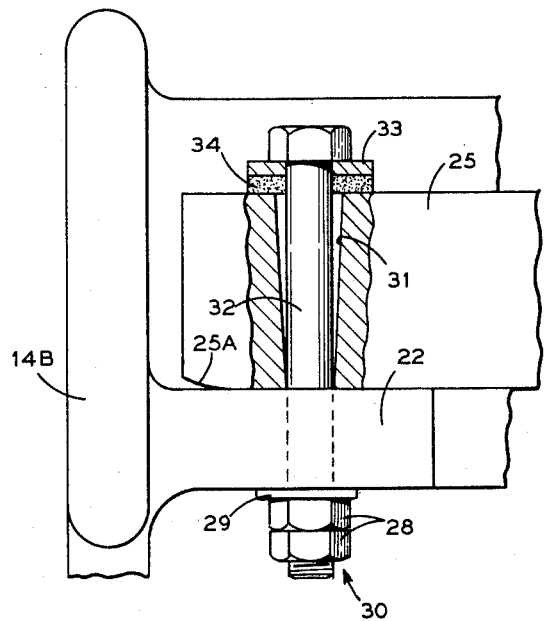
FIG. 8 is a detail view of the support plate hinge joint.

The hinge assembly 30, adjacent the rearward portion 14B of the frame 14 and interconnecting the rearward end of the plate 25 to the horizontal leg 22 of the frame 14, includes a pair of similar hinge units, one of which is shown in detail in FIG. 8. In each hinge unit, the plate 25 is formed with a tapered hole 31 having its smallest diameter at the bottom of the plate 25. The hinge bolt 32, of constant diameter is inserted in the tapered hole 31 and passes through an opening in the horizontal leg 22 of the frame 14. It should be noted that the bolt 32 and the walls of the tapered hole cooperate to form a tapered annular space decreasing in the direction of the leg 22 of the frame 14. A metallic washer 33 and a resilient washer 34 are interposed between the head of the hinge bolt 32 and the plate 25, and the bolt 32 is secured at its lower end by a metallic washer 29 and lock nuts 28. The metallic washers 29 and 33 may suitably be formed of brass, and the resilient washer 34 may suitably be formed of neoprene. It should also be noted that the lower rearward edge of the plate 25 is formed with a slightly curved surface 25A.

By viewing FIG. 8 in conjunction with FIG. 1, it can be seen that when the forward edge of the plate 25 is urged upwardly, the plate 25 will rotate slightly about the base of the tapered hole 31. It should be noted that this hinging action compresses the forward portion of the neoprene washer 34 and that the hinging movement is limited by the amount of compression which can occur in the neoprene washer 34.

It should be particularly noted that the degree of fit between the hinge bolt 32 and the smallest diameter of the tapered hole 31 is very important to the proper functioning of the hinge assembly 30. The smallest diameter of the tapered hole 31 should be no more than .003 inch in diameter greater than the diameter of the hinge bolt 32. This close fit is required to avoid lateral movement of the plate 25, since the hinge assembly 30 constitutes the only lateral restraining means for the plate 25. If lateral movement of the plate were allowed, this movement would be magnified at the electrode contacts 63 and would result in intolerable lateral movement of the contacts 63 relative to the tube 10. In practice, the above described hinge assembly has been shown to provide the necessary limited hinging action while additionally providing the required restraint of lateral movement of the contacts 63; however, it should be recognized that other suitable hinge joints could also be used to effect the same results.

The forward end of the plate 25 is connected to the horizontal forward leg 21 of the frame 14 by a spring connection 35 (see FIG. 1) which consists of a pair of spring units disposed at opposite front corners of the plate 25. Each spring unit includes a bolt 36 which passes through a suitably sized opening in the horizontal leg 21 of the frame 14. A coil compression spring 38 is disposed about the bolt 36 above the plate 25 and is engaged therewith. The spring is held in compression by the lock nuts 39 threadably engaged on the upper end of the bolt 36 in cooperation with the nut 37 which is in contact with the underside of leg 21. It will be recognized that the extent of compression of the spring 38 can readily be changed by adjustment of the nuts 39.

A dial indicator 80 (see FIG. 1) is rigidly fastened to the frame 14 at its forward end by the rod 81. The sensing arm of the dial indicator 80 is engaged with the stud 82 which passes through an elongated opening 83 in the forward portion 14A of the frame 14 and is threadably connected to the forward edge of the plate 25. The dial indicator 80, which may be calibrated to read in thousandths of an inch, will register the relative position of the front end of the plate 25 with respect to the frame 14. More partcularly, during operation the dial indicator 80 is used to indicate the distance between the front lower edge of the plate 25 and the adjacent upper surface of the leg 21 of the frame 14. It should be noted in FIG. 1 that the forward edge of the plate 25 is approximately over the point of contact between the contacts 63 of the electrode assembly 50 and the tube 10.

To begin operation, the frame 14, carrying the entire flexible electrode welding assembly, is lowered by turning the drive arm 16 until the contacts 63 engage the tube adjacent the edges of the V-gap 9. Upon the further lowering of the frame 14, an upward force is exerted on the contacts 63 thereby causing the lower conductor 52 to rotate about the pivot point 53 relative to the upper conductor 51 compressing the springs 71. This relative rotation between the upper and lower conductors 51 and 52 continues until the stop bolt 77 engages the upper extremity of the slot 76 in the retainer bar 74, at which time the upper surface 52A of the lower conductor 52 and the lower surface 51A of the upper conductor 51 are in approximate parallel relationship to each other. As the welding frame 14 is lowered still further, the upward force exerted on the contacts 63 raises the forward end of the plate 25 away from the top surface of the horizontal leg 21 of the frame 14. The frame 14 is lowered until a predetermined space between the forward end of the plate 25 and the leg 21 is established. It should be recognized that the space may be monitored on the dial indicator 80. Having thus positioned the flexible electrode welding assembly relative to the tube 10, the tube forming mill drive is started and accelerated to normal operating speed. The power is then introduced to the transformer 40 and welding is commenced. By using this starting sequence, the amount of open seam (scrap) tubing is minimized.

It should be recognized that the above described starting sequence takes place within a matter of a few seconds and that the entire operation may be accomplished by a technician of ordinary skill.

In relation to the above described starting sequence, and to more precisely describe the inventive character of the welding assembly, several critical points should be noted. It is of prime importance that the slots 76 in the upper conductors 51 be machined so that the stop bolts reach their limits at the same time. It should also be noted that the relative sizes and strength of the upper electrode springs 38 and the lower electrode springs 71 must be such that the lower springs 71 attain their maximum allowed compression (as limited by the slots 76) before the plate 25 is raised from engagement with the leg 21 of the frame 14. The reason for this requirement will become obvious in the following description of the operation of the apparatus.

During operation, for the reasons described above, the surfaces of the tube 10 on which the contacts 63 ride may be subject to slight vertical deviations from strict axial movement. These deviations may be such that both tube edges remain at a common level, or a slight difference in height between the two edges may exist.

For the purposes of this description, assume that a slight dip occurred in the tube 10 and that both edges remained at a common level. In such an instance, the contacts 63 would follow the dip in the tube 10 because of the force exerted by the upper springs 38, and these springs 38 would elongate an amount substantially equal to the extent of the dip in the tube 10. It should be noted that in such an instance there would be no movement of the lower electrode springs 71 since the tube edges are on a common level, and there would therefore be no relative rotation between the upper and lower conductors 51 and 52. Correspondingly, a rise in the tube 10 would cause the upper springs 38 to be further compressed and there would again be no action by the lower springs 71. Thus, so long as the edges of the tube 10 remain at a common height relative to each other, any deviations of the tube edges from strict axial movement will be accommodated by the spring connection 35, thereby assuring proper and adequate contact pressure between the contacts 63 and the tube 10.

Figure 10:
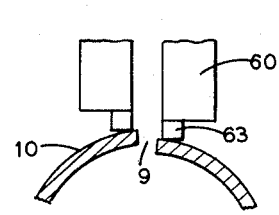
FIG. 10 is a sectional view taken along line 10—10 of FIG. 9 showing a condition where the tube has been imperfectly formed, with one edge higher than the other.

Consider now the other variation which may be compensated for by this welding assembly, viz, assume that one edge of the tube 10 remains at a certain height and that the other edge dips relative thereto as is shown in FIG. 10. In this instance the required downward movement of the contact 63 corresponding to the lower of the tube edges would be accommodated by the corresponding lower electrode springs 71, and the upper and lower conductors 51 and 52 of that electrode would rotate relative to each other about the pivot point 53. The spring connection 35 would not change position in this instance. From this it can be seen that differences in the relative height of the edges of the tube may be readily accommodated by the action of the spring 71, which is operative in relation to the electrode corresponding to the lower of the tube edges.

In actual operation, vertical deviations of both of the types described may occur simultaneously, in which case the net effect of the deviations would cause the upper spring connection 35 to accommodate vertical deviations of the uppermost tube edge, while the electrode springs 71 would accommodate any relative differences in the height of the edges, i.e., the spring corresponding to the lower edge would operate to allow the appropriate contact 63 to follow the relative downward movement of the lowermost edge. Thus it can be seen that this flexible electrode assembly will provide continuous and uniform contact between the contacts 63 and the tube 10 when the tube edges are subject to slight vertical deviations from strict axial travel even though the deviations be of a random nature.

In the above described apparatus, it is important that both contacts 63 engage the tube 10 at constant and equal distances from the welding point 11 so that the length of the path of travel of the welding current along the tube edges bounding the V-shaped gap 9 is maintained constant, thus insuring uniform heating of the tube edges as they approach the welding point 11. In actual practice it has been found that a defective weld will result if the current path length is increased by ½ inch or more without a corresponding increase in welding current. In order to establish and maintain a constant current path length, the entire welding assembly is tilted slightly forwardly so that the "toes" or forward portions of the contacts 63 are engaged with the tube 10. In this regard, it should be noted that the arrangement of the present invention insures that the "toes" of the contacts 63 will be engaged with the tube 10 under all operating conditions. Referring to FIGS. 1 and 4, when either or both of the tube edges vary in a downward direction from strict axial travel, the contacts 63 correspondingly rotate clockwise about either the hinge assembly 30 or the pivot point 53 and move downwardly to follow the edges of the tube 10 because of the forces exerted by the upper spring connection 35 and/or the electrode springs 71. Since the rotation is clockwise, the tendency is for the "toes" of the contacts 63 to remain engaged with the tube 10. When either or both of the tube edges vary in an upward direction from strict axial travel, the tendency is for the contacts 63 to rotate counterclockwise about the hinge assembly 30, which would normally result in the "heels" or rearward portions of the contacts 63 engaging the tube 10 with a consequent loss of contact between the "toes" and the tube 10, and an undesirable increase in length of the current flow path. However, because of the large lever distance between the hinge assembly 30 and the contacts 63, the slight amount of counterclockwise rotation effects only a negligible amount of change in the relative positions of the contacts 63 and the tube 10 so that the contact "toes" remain engaged with the tube 10. It should be specifically noted that counterclockwise rotation of the contacts 63 relative to the pivot point 53 is precluded by the engagement of the stop bolt 77 with the upper ends of their respective slots 76. Since the upper spring connection 35 and hinge assembly 30 accommodate vertical deviations of the uppermost tube edge, and since the electrode springs 71 accommodate only relative differences in the height of the edges, the rotation of the contacts 63 in a counterclockwise direction along the relatively short lever arm about the pivot point 53 can never occur. Thus, all rotation of the contacts 63 in a counterclockwise direction is about the hinge assembly 30, which effects a negligible change in the relative positions of the tube 10 and the contacts 63 because of the substantial length of the lever arm. From the above it can be seen that the flexible welding assembly described above provides for constant maintenance of the engagement of the "toes" of the contacts 63 with the tube 10 so that the tube edges may be uniformly heated as a result of a constant current path length to effect constant welding temperature at the welding point 11.

It should be also noted that if the "heels" or rearward portions of the contacts 63 were engaged with the tube 10, in lieu of the "toes," the tube edges would be heated while still under the contacts 63, and rapid deterioration of the contacts 63 would result. As shown in FIG. 9, the contacts 63 are preferably mounted on the shoes 60 at a slight angle, i.e., they are "toed in" slightly, so that the edges of the shoes 63 are parallel to the edges of the tube 10 which form the V-shaped gap 9.

The magnitude of the vertical deviations of the tube edges from strict axial or horizontal movement is, of course, dependent to some extent on the wall thickness and diameter of the tube being formed. In practice, these deviations have been found not to exceed 0.010 inch in normal operation. By observing the dial indicator 80, the operator can monitor the deviations thereby obtaining an indication of the performance of the tube forming and welding operation.

The desired amount of engaging force with which the contacts 63 are exerted into engagement with the tube 10 is likewise dependent on the wall thickness and diameter of the tube being formed. For example, if a thin walled, large diameter tube is being welded, the application of excessive force by the contacts 63 could deflect the edges of the tube downwardly, cause the mis-alignment of the edges at the welding point 11, and thereby produce a defective weld. By way of description and not limitation, it has been found that a force of about 125 pounds on each contact will produce satisfactory welds in a normal tube size, e.g., 2 inch O.D. tube with 0.2 inch wall thickness. Suitable spring loading values for producing this force are, 150 pounds at 1.75 inches of maximum compressed length for the upper springs 38, and 110 pounds at .80 inch of maximum compressed length for the lower springs 71. Springs of this specification produced the requisite force level with an initial setting of 0.100 inch as the dimension of the space between the forward edge of the plate 25 and the leg 21 of the frame 14. It should be noted that this initial distance should be set above the expected maximum deviation. The force exerted by the contacts 63 on the tube 10 may be varied by tightening down the nuts 39 of the spring connection 35, or alternatively, by lowering the frame 14 with respect to the tube 10.

Normal contact wear for conditions as described above is about 0.001 inch per 350 lineal feet of tube travel. This shoe wear can be monitored by the operator by means of the dial indicator 80. By means of predetermined conversion charts, the operator can convert the readings of the dial indicator 80 to the force between the contacts 63 and the tube 10. Thus, by mechanically adjusting the height of the frame 14 to maintain the initial dial indicator reading, the operator can adjust the vertical position of the welder to maintain the desired force level on a constant basis. It has been found that, because of the ability to monitor and regulate contact loading and wear, the proper conditions conducive to assuring satisfactory welds can be more easily maintained. Additionally, because the "toes" of the contacts 63 are continuously engaged with the tube 10 as described above, erosion and deterioration of the contacts 63 due to overheating have been minimized. Thus, use of the present apparatus has generally resulted in less contact wear with a consequent reduction in cost of the expensive contact material, a reduction in tube mill down time required to change shoes 60, and generally improved quality of finished welded tubing product.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate mounted on said frame, a pair of electrodes connected to said support plate and extending downwardly therefrom, said electrodes including electrode shoes arranged to slidably engage said tube immediately adjacent said gap edges at positions in advance of said welding point, a source of high frequency current connected to said electrodes, means for selectively raising and lowering said support frame, and means for effecting continuous and uniform contact between said shoes and said tube, said last named means including a spring connection between one end portion of said support plate and said frame for urging said support plate downwardly toward said frame and urging said shoes into engagement with said tube, said end portion of said plate in its normal operative position being displaced from said frame a predetermined distance, said spring connection allowing vertical displacement of said shoes corresponding to vertical deviations of said tube from strict axial movement.

2. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate mounted on said frame, a pair of electrodes connected to said support plate and extending downwardly therefrom, said electrodes including electrode shoes arranged to slidably engage said tube immediately adjacent said gap edges at positions in advance of said welding point, a source of high frequency current connected to said electrodes, means for selectively raising and lowering said support frame, and means for effecting continuous and uniform contact between said shoes and said tube, said last named means including a hinge joint pivotally connecting one end portion of said support plate to said frame, and a spring connection between the opposite end portion of said support plate and said frame for urging said support plate downwardly toward said frame and urging said shoes into engagement with said tube, said opposite end portion of said support plate in its normal operative position being displaced from said frame, said hinge joint and said spring connection cooperating to allow vertical displacement of said shoes corresponding to vertical deviations of said tube from strict axial movement.

3. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate mounted on said frame, a pair of electrodes connected to said support plate and extending downwardly therefrom, said electrodes including electrode shoes arranged to slidably engage said tube immediately adjacent said gap edges at positions in advance of said welding point, a source of high frequency current connected to said electrodes, means for selectively raising and lowering said support frame, and means for effecting continuous and uniform contact between said shoes and said tube, said last named means including a hinge joint pivotally connecting one end portion of said support plate to said frame, and a spring connection between the opposite end portion of said support plate and said frame for urging said support plate downwardly toward said frame and urging said shoes into engagement with said tube, said opposite end portion of the support plate in its normal operative position being displaced from said frame, said hinge joint comprising means forming an opening in said support plate, and a bolt received in said opening and interconnecting said support plate and frame, said bolt cooperating with the walls of said opening to form a tapered annular space decreasing in the direction of said frame, said hinge joint and said spring connection cooperating to allow vertical displacement of said shoes corresponding to vertical deviations of said tube from strict axial movement.

4. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate mounted on said frame, a pair of electrodes connected to said support plate and extending downwardly therefrom, said electrodes including electrode shoes arranged to slidably engage said tube immediately adjacent said gap edges at positions in advance of said welding point, a source of high frequency current connected to said electrodes, means for selectively raising and lowering said support frame, and means for effecting continuous and uniform contact between said shoes and said tube, said last named means including a hinge joint pivotally connecting one end portion of said support plate to said frame, a spring connection between the opposite end portion of said support plate and said frame for urging said support plate downwardly toward said frame and urging said shoes into engagement with said tube, said opposite end portion of the support plate in its normal operative position being displaced a predetermined distance from said frame, and an indicating device connected between said opposite end portion of the support plate and said frame to continuously register said distance, said hinge joint, spring connection and indicating device cooperating to allow the exertion of controlled pressure on said tube by said shoes and to allow vertical displacement of said shoes corresponding to vertical deviations of said tube from strict axial movement.

5. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate mounted on said frame, a pair of electrodes connected to said support plate and extending downwardly therefrom, each of said electrodes including an upper conductor, a lower conductor pivotally connected to said upper conductor, and an electrode shoe attached to said lower conductor, said electrode shoe being arranged to slidably engage said tube immediately adjacent said gap edges at positions in advance of said welding point, a source of high frequency current connected to said electrodes, means for selectively raising and lowering said support frame, and means for effecting continuous and uniform contact between said electrodes and said tube, said last named means comprising a spring connection between one end portion of said support plate and said frame for urging said support plate downwardly toward said frame and urging said shoes into engagement with said tube, and spring means operative between the upper and lower conductors of each of said electrodes for individually urging said shoes into engagement with said tube, said end portion of said plate in its normal operative position being displaced from said frame a predetermined distance, said spring connection and spring means allowing vertical movement of said shoes corresponding to vertical deviations of said edges from strict axial movement.

6. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate mounted on said frame, a pair of electrodes connected to said support plate and extending downwardly therefrom each of said electrodes including an upper conductor, a lower conductor resiliently connected to said upper conductor, and an electrode shoe attached to said lower conductor, said electrode shoe being arranged to slidably engage said tube immediately adjacent said gap edges at positions in advance of said welding point, a source of high frequency current connected to said electrodes, means for selectively raising and lowering said support frame, and means for effecting continuous and uniform contact between said electrodes and said tube, said last named means comprising first spring means interconnecting said support plate and said frame for accommodating vertical deviations of the uppermost edge of said tube from strict axial movement, and second spring means operative between the upper and lower conductors of said electrodes for accommodating vertical differences between the tube edges.

7. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate formed of a non-magnetic material and mounted on said frame, a pair of electrodes rigidly connected to said support plate and extending downwardly therefrom, each of said electrodes including an upper conductor, a lower conductor pivotally connected to said upper conductor, an electrode shoe attached to said lower conductor and arranged to slidably engage said tube immediately adjacent one of said gap edges at a position in advance of said welding point, and means limiting relative rotation of said upper and lower conductors in one direction only, a source of high frequency current connected to said electrodes, means for selectively raising and lowering said support frame, and means for effecting continuous and uniform contact between said electrodes and said tube, said last named means comprising first spring means interconnecting said support plate and said frame for accommodating vertical deviations of the uppermost edge of said tube from strict axial movement, and second spring means individually operative between the upper and lower conductors of each of said electrodes for accommodating vertical differences between the tube edges.

8. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate formed of a non-magnetic material and mounted on said frame, a pair of electrodes rigidly connected to said support plate and extending downwardly therefrom, each of said electrodes including an upper conductor, a lower conductor pivotally connected to said upper conductor, an electrode shoe attached to said lower conductor and arranged to slidably engage said tube immediately adjacent one of said gap edges at a position in advance of said welding point, and means limiting relative rotation of said upper and lower conductors in one direction only, said last named means comprising means forming an elongated opening in one of said conductors, and a stop bolt received in said opening and rigidly connected to the other of said conductors, said stop bolt being engaged with one extremity of said elongated opening in its normal operative position, a source of high frequency current connected to said electrodes, means for selectively raising and lowering said support frame, and means for effecting continuous and uniform contact between said electrodes and said tube, said last named means comprising first spring means interconnecting said support plate and said frame for accommodating vertical deviations of the uppermost edge of said tube from strict axial movement, and second spring means individually operative between the upper and lower conductors of each of said electrodes for accommodating vertical differences between the tube edges.

9. Apparatus for welding together the edges defining a longitudinal gap in a metal tube comprising means for horizontally and axially moving said tube, means for applying pressure thereto to close said gap at a welding point, an upright stationary welder support mounted adjacent said tube, a support frame connected to said welder support and overlying said tube, a support plate mounted on said frame, a pair of electrodes connected to said support plate and extending downwardly therefrom, each of said electrodes including an upper conductor, a lower conductor pivotally connected to said upper conductor, an electrode shoe attached to said lower conductor and arranged to slidably engage said tube immediately adjacent one of said gap edges at a position in advance of said welding point, and means limiting relative rotation of said upper and lower conductors in one direction only, a source of high frequency current connected to said electrodes, means for selectively raising and lowering said support frame, and means for effecting continuous and uniform contact between said electrodes and said tube, said last named means comprising a hinge joint pivotally connecting one end portion of said support plate to said frame, first spring means interconnecting the opposite end portion of said support plate and said frame for accommodating vertical deviations of the uppermost edge of said tube from strict axial movement, second spring means individually operative between the upper and lower conductors of each of said electrodes for accommodating vertical differences between the tube edges, said opposite end portion of the support plate in its normal operative position being displaced a predetermined distance from said frame, and an indicating device connected between said opposite end portion of the support plate and said frame to continuously register said distance.

References Cited in the file of this patent

UNITED STATES PATENTS

| | | |
|---|---|---|
| 2,136,059 | Sciaky | Nov. 8, 1938 |
| 2,833,910 | Stanton et al. | May 6, 1958 |
| 3,056,882 | Morris et al. | Oct. 2, 1962 |